United States Patent [19]

Alexander

[11] Patent Number: 4,482,933
[45] Date of Patent: Nov. 13, 1984

[54] MULTILAYER DOPED CERAMIC CAPACITOR

[75] Inventor: John H. Alexander, Bishop's Stortford, England

[73] Assignee: ITT Industries, Inc., New York, N.Y.

[21] Appl. No.: 398,471

[22] Filed: Jul. 15, 1982

[30] Foreign Application Priority Data

Jul. 30, 1981 [GB] United Kingdom ............... 8123349

[51] Int. Cl.³ .......................... H01G 4/10; H01G 7/00
[52] U.S. Cl. .................................. 361/321; 29/25.42
[58] Field of Search ...................... 361/321; 29/25.42

[56] References Cited

U.S. PATENT DOCUMENTS

| 3,539,886 | 11/1970 | Kellerman | 29/25.42 X |
| 4,027,209 | 5/1977 | Maher | 361/321 |
| 4,082,906 | 4/1978 | Amin et al. | 361/321 X |
| 4,189,760 | 2/1980 | Marshall | 361/321 |

FOREIGN PATENT DOCUMENTS

| 53-248 | 4/1979 | Japan | 361/321 |
| 1373575 | 11/1974 | United Kingdom . | |
| 1424879 | 2/1976 | United Kingdom . | |
| 1486308 | 9/1977 | United Kingdom . | |

OTHER PUBLICATIONS

IEEE Transactions on Parts, Hybrids, and Packaging Sep. 1973 vol. PHP-9 No. 3, pp. 144–147.

*Primary Examiner*—Donald A. Griffin
*Attorney, Agent, or Firm*—John T. O'Halloran; Peter R. Ruzek; Mary C. Werner

[57] ABSTRACT

Ceramic capacitors are made by printing green ceramic limps with a fugitive electrode material, stacking the printed limps and firing the stacked assembly to form the ceramic and remove the fugitive electrodes. This provides an array of laminar voids in the body. The ceramic is doped to form boundary layers, terminations are applied, and the voids are then filled, such as by vacuum impregnation, with an electrode metal.

10 Claims, 6 Drawing Figures

MULTILAYER DOPED CERAMIC CAPACITOR

BACKGROUND OF THE INVENTION

This invention relates to capacitors and in particular to capacitors in which the dielectric is a ceramic material Ceramic capacitors have been manufactured for several years and have replaced the older types of capacitors, e.g. paper, mica and plastics foil, in numerous applications. Ceramic dielectrics have the advantage of a high dielectric constant and can thus be used to fabricate capacitors of a small physical size.

With the advent of high density printed circuits, thick film circuits and hybrid circuits, there is an increasing requirement for capacitors having higher capacitance/value ratios than are available at present even in the ceramic field. It is well known that the capacitance of a capacitor can be increased in one of two ways. Either the thickness of the dielectric material between the capacitor plates can be reduced or a material of higher intrinsic or effective dielectric constant can be used. In the case of ceramic capacitors, present manufacturing techniques are approaching the limit of "thinness" of the dielectric beyond which the risk of pinholes leading to breakdown between adjacent electrodes becomes unacceptable Techniques have therefore been investigated for increasing the effective dielectric constant of the ceramic material. In particular it has been found that doping of the ceramic grain boundaries results in a substantial increase in the effective dielectric constant and hence in the capacitance value of the capacitor. This technique has not, however, been employed in the commercial production of ceramic capacitors as it has been found that, during the manufacturing process which involves relatively high temperatures, the dopant materials react with the electrode materials with consequent adverse effect on the electrode characteristics of the capacitor.

Ceramic capacitors are usually made by spreading a thin smooth coating of paste containing a ceramic, a binder and a solvent onto a smooth non-absorbent surface. The solvent is allowed to evaporate leaving a thin coherent sheet of the "green" ceramic material. Electrodes are screen printed onto the sheet material which is then subdivided, stacked into multilayers and fired at a high temperature thereby forming the ceramic. It is only after this firing process that doping of the ceramic grain boundaries can be effected in the conventionally manufactured ceramic capacitors by a process involving a second firing at a somewhat lower temperature. It is during this second firing process, typically at 1000° to 1300° C., that reaction of the dopant materials with the electrodes takes place with consequent degradation of the properties of the finished capacitor.

SUMMARY OF THE INVENTION

Accordingly, it is a general object of the present invention to avoid the disadvantages of the prior art.

More particularly, it is an object of the present invention to develop a process for the production of ceramic capacitors which will permit doping of the dielectric ceramic material without adversely affecting the properties of the electrodes.

Still another object of the present invention is to devise a process for the production of such doped ceramic capacitors which will result in the production of low-cost, high-efficiency and high-capacitance ceramic capacitors.

A concomitant object of the present invention is to provide a multilayer high-capacitance ceramic capacitor which has its capacitance increased by doping but in which the doping does not deleteriously influence the properties of the electrodes.

In pursuance of these objects and others which will become apparent hereafter, one feature of the present invention resides in a process for making ceramic capacitors each including a fired body of dielectric ceramic material and a plurality of electrodes extending along predetermined paths in the body, this process comprising the steps of forming a preform substantially in the shape of the body from an unfired precursor of the dielectric ceramic material; providing voids extending along the predetermined courses into the preform; firing the preform into the body; and filling the voids with an electrically conductive material subsequently to said firing step to obtain the electrodes. Advantageously, the forming step includes stacking a plurality of sheets of the unfired precursor, and the providing step includes introducing the voids between the sheets.

The voids may advantageously be provided by so depositing layers of fugitive electrode material on the sheets as to extend in the respective predetermined courses subsequent to the stacking step, and by removing the layers of fugitive electrode material from between the sheets subsequent to the stacking step. The fugitive electrode material is preferably convertible into a low-viscosity fluid at least at the temperature at which the firing step is performed. Then, the removing step is performed during the firing step by converting the fugitive electrode material into the low-viscosity fluid at the firing temperature, and by letting the fluid escape from between the sheets, leaving the voids behind. It is especially advantageous when the process of the present invention further comprises the step of doping the ceramic material prior to the filling step at the grain boundaries present within the fired body after the firing step.

The process of the present invention can be advantageously employed to provide two arrays of the voids, in which case it further includes the steps of applying respective terminations with the respective electrodes accommodated in the voids of the respective arrays.

According to a further facet of the present invention, the doping of the ceramic material is performed using a mixture of metal oxides. The metal oxide mixture advantageously includes 5 to 80 mole % of cuprous oxide, 5 to 80 mole % of bismuth oxide, 3 to 10 mole % of manganese dioxide, and 5 to 50 mole % of lithium oxide.

The electrically conductive material is advantageously introduced into the respective voids in its molten state especially by resorting to vacuum impregnation of the voids with the molten electrically conductive material. The electrically conductive material is advantageously selected from the group consisting of lead and lead alloys. The ceramic material may be strontium titanate or barium titanate.

The present invention also presents a novel multilayer ceramic capacitor, which comprises a stacked array of dielectric ceramic layers which are doped at the grain boundaries and bound respective voids therebetween; and a plurality of electrodes interleaved between the layers and filling the voids, the electrodes consisting of a material impregnated into the array of previously doped layers.

As a result of the doping process, boundary layers are formed at the grain boundaries throughout the ceramic dielectric. The effect of this is that each ceramic sheet becomes equivalent to an arrangement of miniature capacitors coupled in series and in parallel. The net result is an increase in the effective dielectric constant of the ceramic materials.

As the fired electrodes are not present during the relatively high temperature processing stages of the dielectric, the problems of electrode reaction are overcome.

BRIEF DESCRIPTION OF THE DRAWING

Above-mentioned and other features and objects of this invention will become more apparent by reference to the following description taken in conjunction with the accompanying drawing, in which.

DETAILED DESCRIPTION OF THE PREFERRED EMBODIMENT

Figure 1:
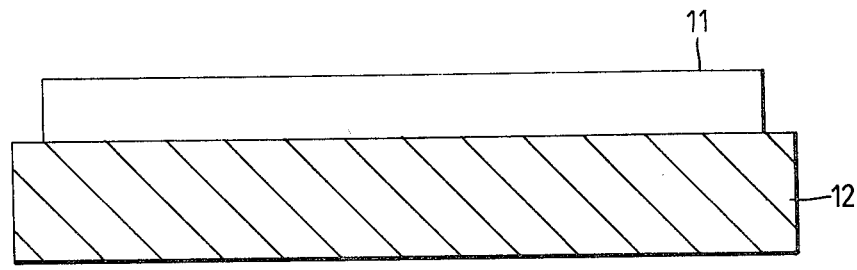
FIGS. 1 to 6 are somewhat diagrammatic cross-sectional views of the components constituting the ceramic capacitor of the present invention and of the capacitor itself during the various stages of the manufacture of such a capacitor.
Figure 2:
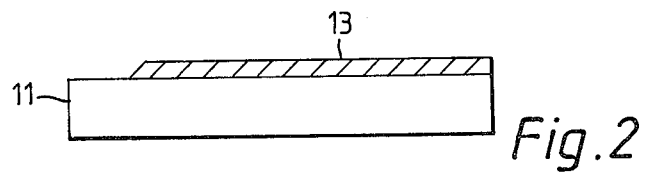

Referring to the drawings, ceramic capacitors of the present invention are initially manufactured in a conventional manner from green ceramic segments or "limps" formed by cutting or stamping from a ceramic sheet. The sheet is formed by spreading a smooth layer 11 (FIG. 1) of a paste containing the finely divided ceramic, an organic binder and a solvent for the binder onto a smooth non-absorbent support surface 12. I currently prefer to form the layer 11 by doctor blading the ceramic paste on plate glass, but other methods can also be used and these will be well known to those skilled in the art. The solvent is allowed to evaporate so that the layer 11 becomes a self-supporting plastic sheet of a material which is a precursor of, and is subsequently converted in a firing operation into, a ceramic dielectric material of the capacitor. The sheet 11 is then cut into segments and in duplication from the prior arts an ink layer 13 (FIG. 2) that will subsequently form a fugitive electrode is printed thereon.

The term fugitive electrode as employed herein is to be understood to refer to a layer of a material, not necessarily conductive, that defines a region to which a permanent conductive electrode is to be subsequently applied, and that comprises a material that evaporates, is burnt away or otherwise converted into a low-viscosity fluid during a subsequent firing process. Typically this fugitive electrode includes finely divided carbon which oxidizes to form carbon dioxide during the firing process.

Figure 3:
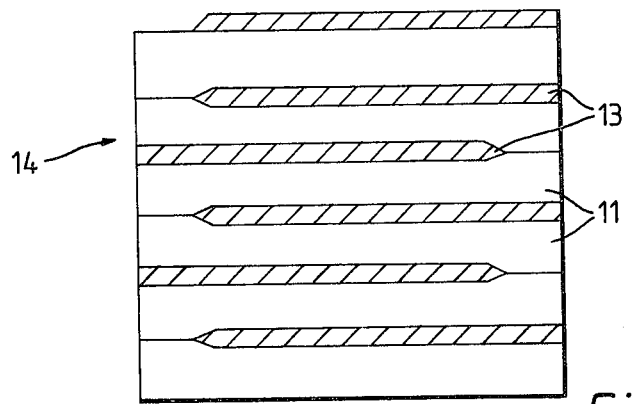
Figure 4:
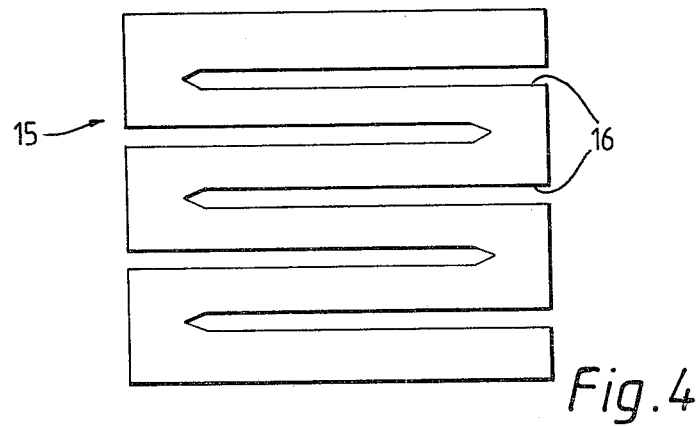
Figure 5:
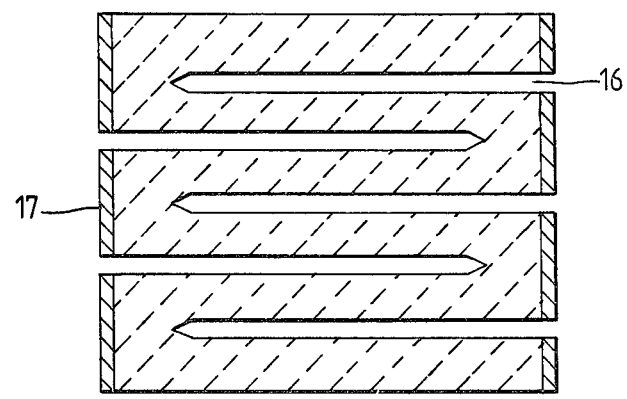

The electroded segments 11 are next stacked and pressed to form a coherent body 14 (FIG. 3) comprising a plurality of the ceramic layers 11 interleaved with the offset fugitive electrodes 13. This multilayer stack 14 is fired at a suitable temperature to form the ceramic, typically 1000° to 1500° C. This firing process also results in evaporation, burning or other conversion of the fugitive electrodes 13 into the low-viscosity fluid, especially gas, which then escapes from between layers 11 and leaves voids 16 behind. In this manner, there is obtained a ceramic body 15 (FIG. 4) having an array of offset parallel laminar voids 16.

The conditions necessary for firing will of course depend on the ceramic material being used. Generally, ceramic dielectrics suitable for the manufacture of boundary layer capacitors fall into two broad classes, those that are fired in a reducing atmosphere, and those that are fired in air. A typical reducing atmosphere dielectric is strontium titanate ($SrTiO_3$) which may contain, for instance, 0.5 to 0.6 atomic percent dysprosium (Dy) and 0.1 to 0.2 atomic percent niobium (Nb) Such a dielectric may be fired undoped at 1450° C. in an atmosphere comprising 90 volume % of nitrogen, 8.5 volume % of hydrogen and 1.5 volume % of oxygen. A typical air fired ceramic is barium titanate ($BaTiO_3$), which may contain 0.6 mole % of samarium (Sa) and is fired in air at 1360° C.

These two ceramic materials are quoted merely as examples of the types of ceramic dielectrics that can be employed in the present process and are in no way to be considered as limiting.

After the firing stage which forms the dielectric, the ceramic is doped in a second lower temperature firing process to provide the insulating grain boundary layers that will subsequently increase the effective dielectric constant and thus the capacitance value of the finished capacitor. Typically this dopant comprises a mixture of metal oxides, such as the oxides of copper, bismuth, manganese, and lithium. I currently prefer to apply this dopant by painting one surface of each body 15 with 0.3 to 1.0 mg/cm$^2$ of a mixture comprising 5 to 80 mole % of cuprous oxide ($Cu_2O$), 5 to 85 mole % of bismuth oxide ($Bi_2O_3$), 3 to 10 mole % of manganese dioxide ($MaO_2$) and 5 to 50 mole % of lithium carbonate ($Li_2CO_3$), and heating the body in air at 1100° to 1200° C. to diffuse the dopant through the ceramic, thus forming the grain boundary layers throughout the ceramic dielectric. At the fusion temperature, the lithium carbonate decomposes in the air to lithium oxide. Other techniques for applying the dopant materials include solution treatment and vapor phase deposition.

After doping has been effected, metal terminations 17 are applied to the multilayer stack 15. This may be effected by any of the methods known in the art. Typically the terminations 17 are made from a conductive ink, for example a silver based ink, which is applied to the stack 15 and is then fired on. Typically temperatures in the region of 750° C. are required for this process, but it will of course be clear that this firing temperature will depend on the nature of the conductive ink employed. There is a wide variety of conductive inks available for the function of capacitor terminations and the selection and use of these inks will be familiar to those skilled in the art.

Figure 6:
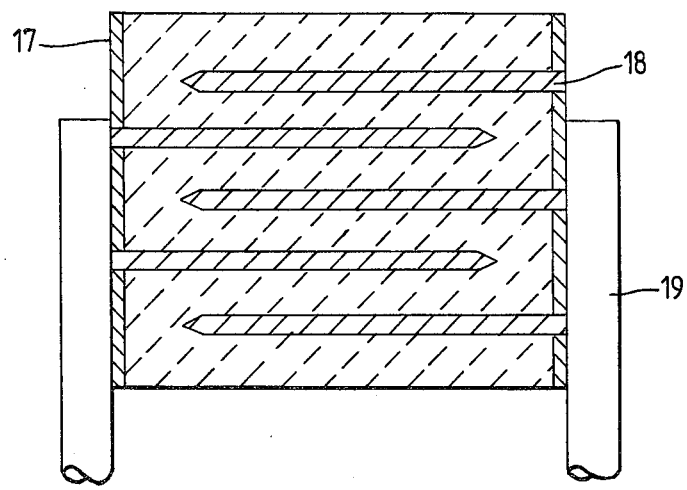

Once the terminations 17 have been formed, the voids 16 can be filled with a conductive material 18 (FIG. 6) to form the capacitor electrodes. There are various methods of filling the voids 16 with conductive material, but I prefer to employ a vacuum impregnation process, wherein the voids 16 are evacuated and then pressure filled with a molten metal, e.g. lead. Typically I employ impregnation pressures up to 40 p.s.i.

After impregnation, the capacitors are allowed to cool, contact leads 19 are applied to the terminations 17 and, advantageously, the finished capacitor is encapsulated.

It will be appreciated by those skilled in the art that the techniques described herein can be employed with a wide variety of ceramic dielectric materials and are not limited to any one type of ceramic. It will also be appreciated that, as the permanent electrodes are not heated to the ceramic firing temperature, the usual constraints on the electrode materials that can be employed are removed. Thus, instead of the commonly employed precious metal electrodes, a variety of much cheaper base metals or base metal alloys can be employed.

While I have described above the principles of my invention in connection with specific apparatus, it is to be clearly understood that this description is made only by way of example and not as a limitation to the scope of my invention as set forth in the accompanying claims.

I claim:

1. In a process for making ceramic capacitors each including a fired body of dielectric ceramic material and a plurality of electrodes extending along predetermined courses in the body, the steps of:
   forming a preform substantially in the shape of the body from an unfired precursor of the dielectric ceramic material;
   introducing into said preform a fugitive electrode material convertible into a low viscosity fluid at a temperature approaching that of the firing temperature of the preform;
   firing the preform into the body;
   causing said converted electrode material to escape from the body to provide voids extending along the predetermined courses into the body;
   applying a layer of at least one metal oxide to the fired body;
   heating the body to a temperature just sufficient to cause migration of the at least one metal oxide into the grain boundaries of the body in order to form boundary layers and increase the dielectric constant of the fired ceramic material; and
   filling the voids with an electrically conductive material to obtain the electrodes.

2. The process as defined in claim 1, wherein said causing step includes providing two arrays of the voids; and further comprising the steps of applying respective terminations for the arrays to the fired body, and electrically connecting the terminations with the respective electrodes accommodated in the voids of the respective arrays.

3. The process as defined in claim 1, wherein said filling step includes introducing the electrically conductive material in its molten state into the respective voids.

4. The process as defined in claim 3, wherein said introducing step includes vacuum impregnation of the voids with the molten electrically conductive material.

5. The process as defined in claim 3, wherein said electrically conductive material is selected from the group consisting of lead and lead alloys.

6. The process as defined in claim 1, wherein the ceramic material is strontium titanate.

7. The process as defined in claim 1, wherein the ceramic material is barium titanate.

8. In a process for making ceramic capacitors each including a fired body of dielectric ceramic material and a plurality of electrodes extending along predetermined courses in the body, the steps of:
   forming a preform substantially in the shape of the body from an unfired precursor of the dielectric ceramic material;
   introducing into said preform a fugitive electrode material convertible into a low viscosity fluid at a temperature approaching that of the firing temperature of the preform;
   firing the preform into the body;
   causing said converted electrode material to escape from the body to provide voids extending along the predetermined courses into the body;
   doping the ceramic material at the grain boundaries present within the fired body with a mixture of a metal oxide which includes 5 to 80 mole % of cuprous oxide, 5 to 80 mole % of bismuth oxide, 3 to 10 mole % of manganese dioxide, and 5 to 50 mole % of lithium oxide; and
   filling the voids with an electrically conductive material to obtain the electrodes.

9. A multilayer ceramic capacitor, comprising
   a stacked array of dielectric ceramic layers bounding voids therein voids therein, said layers having been fired from a precursor body from which a gugitive electrode material convertible into a low viscosity material at the firing temperature has been caused to escape to form said voids, whereupon said precursor body had a layer of dopant material applied thereto and was heated to cause migration of the dopant material into the body; and
   a plurality of electrodes interleaved between said layers and filling said voids, said electrodes consisting of a material impregnated into said voids of said array of doped layers.

10. In a process for making ceramic capacitors each including a fired body of dielectric ceramic material and a plurality of electrodes extending along predetermined paths in the body, the steps of
    forming a preform substantially in the shape of the body from an unfired precursor of the dielectric ceramic material;
    providing voids extending along the predetermined courses into the preform;
    firing the preform to form the body and to form voids extending along the predetermined paths;
    causing migration of a dopant material at the grain boundaries present within the fired body; and
    filling the voids with an electrically conductive material subsequently to said firing step to obtain the electrodes.

* * * * *